(12) United States Patent
Schneuwly et al.

(10) Patent No.: US 11,449,517 B2
(45) Date of Patent: Sep. 20, 2022

(54) KERNEL SUBSAMPLING FOR AN ACCELERATED TREE SIMILARITY COMPUTATION

(71) Applicant: Oracle International Corporation, Redwood Shores, CA (US)

(72) Inventors: Arno Schneuwly, Effretikon (CH); Nikola Milojkovic, Dietikon (CH); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 164 days.

(21) Appl. No.: 17/131,299

(22) Filed: Dec. 22, 2020

(65) Prior Publication Data

US 2022/0197917 A1   Jun. 23, 2022

(51) Int. Cl.
*G06F 16/2457* (2019.01)
*G06N 20/00* (2019.01)
*G06F 16/93* (2019.01)

(52) U.S. Cl.
CPC ........ *G06F 16/24578* (2019.01); *G06F 16/93* (2019.01); *G06N 20/00* (2019.01)

(58) Field of Classification Search
CPC .... G06F 16/93; G06F 16/24578; G06N 20/00
See application file for complete search history.

(56) References Cited

U.S. PATENT DOCUMENTS 5,822,592 A    10/1998  Zhu
9,020,871 B2    4/2015  Lane et al.
2017/0083827 A1  3/2017  Robatmili et al.
2017/0161637 A1  6/2017  Misra et al.
2017/0169360 A1  6/2017  Veeramachaneni et al.
2019/0095756 A1  3/2019  Agrawal
(Continued)

FOREIGN PATENT DOCUMENTS

EP    2 945 113 A1    11/2015
EP    3 101 599 A2    12/2016
WO    WO 2008/133509 A1    11/2008

OTHER PUBLICATIONS

Zhen Hua Liu et al. "JSON Data Management in RDBMS", Emerging Technologies and Applications in Data Processing and Management, dated May 13, 2019, pp. 20-45.

(Continued)

*Primary Examiner* — Hau H Hoang
(74) *Attorney, Agent, or Firm* — Hickman Becker Bingham Ledesma LLP; Brian N. Miller

(57) ABSTRACT

Approaches herein relate to machine learning for detection of anomalous logic syntax. Herein is acceleration for comparison of parse trees such as suspicious database queries. In an embodiment, a computer identifies subtrees in each of many trees. A respective subset of participating subtrees is selected in each tree. A respective root node of each participating subtree should directly have a child node that is a leaf and/or should have a degree that exceeds a branching threshold such as one. For each pairing of a respective first tree with a respective second tree, based on a count of subtree matches between the participating subset of subtrees in the first tree and the participating subset of subtrees in the second tree, a respective tree similarity score is calculated. A machine learning model inferences based on the tree similarity scores of the many trees. In an embodiment, each tree similarity score is a convolution kernel.

20 Claims, 7 Drawing Sheets

(56) References Cited

U.S. PATENT DOCUMENTS

2020/0076841 A1  3/2020  Hajimirsadeghi
2020/0364585 A1  11/2020  Chandrashekar

OTHER PUBLICATIONS

Knut Anders Hatlen, "Partial Update of JSON Values", MySQL Server Blog, dated Apr. 3, 2018, 6 pages.
He et al., "A Reusable SQL Injection Detection Method for Java Web Applications", KSII Transactions on Internet and Information Systems vol. 14, No. 6, dated Jun. 2020, 15 pages.
Flegel et al., "Detection of Intrusions and Malware, and Vulnerability Assessment", Springer, 6th International Conference, DIMVA 2009 Como, Italy,dated Jul. 9-10, 2009, 232 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Alon et al., "A General Path-Based Representation for Predicting Program Properties", dated Apr. 22, 2018, 16 pages.
HaddadPajouh et al, "A Two-layer Dimension Reduction and Two-tier Classification Model for Anomaly-Based Intrusion Detection in IoT Backbone Networks", dated 2016, 12 pages.
Aldave et al., "Systematic Ensemble Learning fro Regression" dated Mar. 28, 2014, pp. 1-38.
Doan et al., "Algorithm Selection Using Performance and Run Time Behavior", Chapter, Artificial Intelligence: Methodology, Systems and Applicationsm AIMSA dated Sep. 2016, pp. 3-13.
Doan et al., "Selecting Machine Learning Algorithms using Regression Models", https://www.researchgate.net/publication/304298580, dated Nov. 2015, 8 pages.
Du et al. DeepLog: Anomaly Detection and Diagnosis from System Logs through Deep Learning, CCS'17, Oct. 30-Nov. 3, 2017, 14 pages.
Feurer et al. "Efficient and Robust Automated Machine Learning", dated 2015, 9 pages.
Gama et al., "A Survey on Concept Drift Adaptation", ACM Computing Surveys, vol. 1, No. 1, Article 1, Publication date: Jan. 2013, 44 pages.
Dai et al., "Semi-supervised Sequence Learning", dated 2015, 9 pages.
Golan et al., "Deep Anomaly Detection Using Geometric Transformations", 32nd Conference on Neural Information Processing Systems (NeurIPS dated 2018), Montréal, Canada, 12 pages.
Conneau et al. "Supervised Learning of Universal Sentence Representations from Natural Language Inference Data", Dated Jul. 21, 2017, 12 pages.
Hill et al., "Learning Distributed Representations of Sentences from Unlabelled Data", dated Feb. 10, 2016, 11 pages.
Hochreiter, Sepp, "Long Short Term Memory", Nural Computation, dated Nov. 15, 1997, 46 pages.
Hu et al., "Anomalous User Activity Detection in Enterprise Multi-Source Logs", dated Nov. 2017, 8 pages.
J.D Wichard, "Model Selection in an Ensemble Framework", The 2013 International Joint Conference on Neural Networks, dated Jan. 1, 2006, pp. 2187-2192.
Jubatus, "Data Conversion" http://jubat.us/en/fv_convert.html, last viewed on May 20, 2019, 27 pages.
Kim et al., "Behavior-based anomaly detection on big data", Edith Cowan University, Research Online, dated 2015, 9 pages.
Kiros et al., "Skip-Thought Vectors", dated 2015, 9 pages.
Ghosh et al., "Detecting Anomalous and Unknown Intrusions Against Programs", dated 1998, 9 pages.
Berlin et al., "Malicious Behavior Detection using Windows Audit Logs", dated Aug. 25, 2015, 10 pages.
Alexey Tsymbal, "The Problem of Concept Drift: Definitions and Related Work", dated Apr. 29, 2004, 7 pages.
Allandadian et al., "A Nonlinear Optimization Method with Focus", dated 2018, 1 page.
Alon, et al., "code2vec: Learning Distributed Representations of Code", Proc. ACM Program. Lang., vol. 3, No. POPL, Article 40. Publication date: Jan. 2019, 29 pages.
Apel et al., "Learning SQL for Database Intrusion Detection using Context-sensitive Modelling", dated 2009, 33 pages.
Bach et al., A Bayesian Approach to Concept Drift, dated 2010, 9 pages.
Bengio et al., "A Neural Probabilistic Language Model", Journal of Machine Learning Research 3, dated Feb. 2003, 19 pages.
Data Science, "How does one go about feature extraction for training labelled tweets for sentiment analysis?", https://datascience.stackexchange.com/questions/30516, last viewed on May 20, 2019, 10 pgs.
Bergstra et al., "Hyperparameter Optimization and Boosting for Classifying Facial Expressions: How good can a "Null" Model be?", ICML Workshop on Representation and Learning, dated 2013, 7 pages.
Kuck et al, "Meta-learning with neural networks and landmarking for forecasting model selection an empirical evaluation of different feature sets applied to industry data", dated Jul. 24-29, 2016, 8pgs.
Bockermann, "Learning SQL for Database Intrusion Detection Using Context-Sensitive Modelling", DIMVA 2009, LNCS 5587, dated 2009, 10 pages.
Bolon-Canedo V et al., "Distributed Feature Selection: An Application to Microarray Data Classification", Applied Soft Computing, vol. 30, dated Feb. 7, 2015, pp. 136-150.
Bontemps et al., "Collective Anomaly Detection based on Long Short Term Memory Recurrent Neural Network", dated Mar. 2017, 13 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Buitinck et al., "API design for machine learning software: experiences from the scikit-learn project", dated Sep. 2013, 15 pages.
Caruana et al., "Ensemble Selection From Libraries of Models", Proceedings, Twenty-First International Conference on Machine Learning: dated Jul. 2004, 8 pages.
Collins et al., "Convolution Kernels for Natural Language", dated 2002, 8 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
Tuor et al., "Deep Learning for Unsupervised Insider Threat Detection in Structured Cybersecurity Data Streams", dated Dec. 15, 2017, 9 pages.
Ruder, Sebastian, "An Overview of Gradient Descent Optimization Algorithms", dated Jun. 15, 2017, 14 pages.
Sabokrou et al., "Real-Time Anomaly Detection and Localization in Crowded Scenes", dated 2015, 7 pages.
Sarkar, Dipanjan, "Continous Numeric Data, Towards Data Science", dated Jan. 4, 2018, 28 pages.
Seleznyov et al., "Anomaly Intrusion Detection Systems: Handling Temporal Relations between Events", dated 1999, 12 pages.
Shen et al., "Scalable Large-Margin Mahalanobis Distance Metric Learning", IEEE, vol. 30, No. 9, dated 2010, 7 pages.
Shipmon et al., "Time Series Anomaly Detection", Detection of Anomalous Drops with Limited Features and Sparse Examples in Noisy Highly Periodic Data, dated 2017, 9 pages.
Kolosnjaji et al., "Deep Learning for Classification of Malware System Call Sequences", dated 2016, 12 pages.
Sutskever et al., "Sequence to Sequence Learning with Neural Networks", dated 2014, 9 pages.
Naseer et al., "Enhanced Network Anomaly Detection Based on Deep Neural Networks", Journal of Latex Class Files, vol. 14, No. 8, Aug. 2015, 16 pages.
Usama et al., "Unsupervised Machine Learning for Networking: Techniques, Applications and Research Challenges", dated Sep. 19, 2017, 37 pages.
Webb et al., Characterizing Concept Drift, Data Mining and Knowledge Discovery, dated Jul. 2016, 30 pages.
Weinberger et al., "Unsupervised learning of image manifolds by semidefinite programming", IEEE, dated Jun. 27, 2004, 10 pages.

(56) References Cited

OTHER PUBLICATIONS

Xiang et al., "Learning a Mahalanobis distance metric for data clustering and classification", Pattern Recognition 41, dated 2008, 13 pages.
Xu, Wei, "System Problem Detection by Mining Console Logs", Technical Report No. UCB/EECS-2010-112, dated Aug. 1, 2010, 110 pages.
Yousefi-Azar et al., "Autoencoder-based Feature Learning for Cyber Security Applications", dated 2017, 8 pages.
YuanZhong, Zhu, "Intrusion Detection Method based on Improved BP Neural Network Research", International Journal of Security and Its Applications vol. 10, No. 5 (2016) pp. 193-202.
Simpson et al, "Automatic Algorithm Selection in Computational Software Using Machine Learning", dated 2016, 10 pages.
Mikolov et al., "Distributed Representations of Words and Phrases and their Compositionality", dated 2013, 9 pages.
Zhou et al., "Tree Kernel-based Relation Extraction with Context-Sensitive Structured Parse Tree Information", dated Jun. 2007, 9 pages.
Le et al., "Distributed Representations of Sentences and Documents", Proceedings of the 31 st International Conference on Machine Learning, Beijing, China, dated 2014, 9 pages.
Liu et al., "Detecting and Preventing Cyber Insider Threats: A Survey", IEEE Communications Survey & Tutorials, dated 2018, 21 pages.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Luo et al., "A Revisit of Sparse Coding Based Anomaly Detection in Stacked RNN Framework", dated Oct. 2017, 9 pages.
Malhotra et al., "Long Short Term Memory Networks for Anomaly Detection in Time Series", ESANN dated Apr. 2015 proceedings, 6 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016-5 pages.
Pradsad Bakshi Rohit et al., "Distributed Feature Selection Using Vertical Partitioning for High Dimensional Data", dated Sep. 21, 2016, IEEE, pp. 807-813.
Mendes-Moreira et al., "Ensemble Approaches for Regression", ACM Computing Surveys, ACM, New York, NY vol. 45, No. 1, dated Dec. 7, 2012, pp. 1-40.
Pinter, Janos, "Calibrating Artificial Neural Networks by Global Optimization", Technical Report, Özyeğin University, Istanbul Submitted for publication: Jul. 2010, 17 pages.
Mikolov et al., "Efficient Estimation of Word Representations in Vector Space", dated Sep. 7, 2013, 12 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Mnih et al., "A Scalable Hierarchical Distributed Language Model", dated 2009, 8 pages.
Moran-Fernandez L et al., "Centralized Vs. Distributed Feature Selection Methods Based on Data Complexity Measures", Knowledge-Based Systems, vol. 117 dated Sep. 28, 2016, pp. 27-45.
Moustafa et al., "A holistic review of Network Anomaly Detection Systems: A comprehensive survey", Journal of Network and Computer Applications vol. 128, Feb. 15, 2019, pp. 33-55.
N. Krishnavardhan, "A Framework to Identify Cybercrime Using Data Analytics", International Journal of Pure and Applied Mathematics, vol. 120, No. 6 dated Jun. 11, 2018, 14 pages.
Kolter et al., "Dynamic Weighted Majority: An Ensemble Method for Drifting Concepts", Journal of Machine Learning Research 8, dated 2007, 36 pages.
Mei et al., "Learning a Mahalanobis Distance based Dynamic Time Warping Measure for Multivariate Time Series Classification", IEEE, dated 2015, 12 pages.

KERNEL SUBSAMPLING FOR AN ACCELERATED TREE SIMILARITY COMPUTATION

FIELD OF THE INVENTION

The present invention relates to machine learning for detection of anomalous logic syntax. Herein is acceleration for comparison of parse trees such as suspicious database queries.

BACKGROUND

Whether intentionally or accidentally, an abnormal logic statement such as a structured query language (SQL) statement may harm a computer process, stored data, and/or personal privacy. A technical problem with detecting an anomalous logic statement is that the statement may contain significant complexity and occur with a problem space of billions of possible distinct statements. Thus, it may be infeasible or impossible to detect that a statement is anomalous until runtime when the statement is submitted for execution. Additionally, latency and accuracy of anomaly detection may be crucial to system security and throughput and may be satisfied by a machine learning (ML) model.

Representing or summarizing a parse tree of a suspect logic statement in a format that an ML model can leverage is another technical problem because of significant flexibility in the internal organization of the logic statement. For example, a programming language is defined by a formal grammar. The grammar defines a set of terminal and non-terminal symbols. The terminal symbols represent acceptable tokens in the source code. In a parse tree such as an abstract syntax tree (AST), those tokens are the leaf nodes. The non-terminal symbols are the set of possible non-leaf nodes in the tree. The grammar defines which combinations of tree nodes are possible according to production rules, which may allow for virtually infinite possible parse trees.

In any case, ML algorithms may require a numeric representation of the input data. For example, an ML model such as an artificial neural network (ANN) may primarily operate by numeric calculations. There are various encoding strategies for ASTs of source logic. A popular way entails explicitly capturing paths of different lengths in the parse tree. That is a straightforward and lightweight way. However, that approach only partially captures structural information of the tree. For example, the captured contextual scope depends on a selected fixed length of the selected paths and thus on configuration settings such as according to model hyperparameter tuning that is fragile and computationally expensive.

Path extraction is an explicit feature extraction strategy that does not scale because the number of features can grow rapidly with an increasing number of available tokens. For example because feature vectors for a same ML model should have a same width, path extraction requires that a feature vector be wide enough to accommodate a biggest expected tree such as a tallest tree, a widest tree, and/or a tree that contains the most tree nodes. Thus, parse trees are difficult to accommodate in feature vectors without significantly lossy encoding, which has limited the evolution of ML analysis of parse trees.

DETAILED DESCRIPTION

Figure 1:
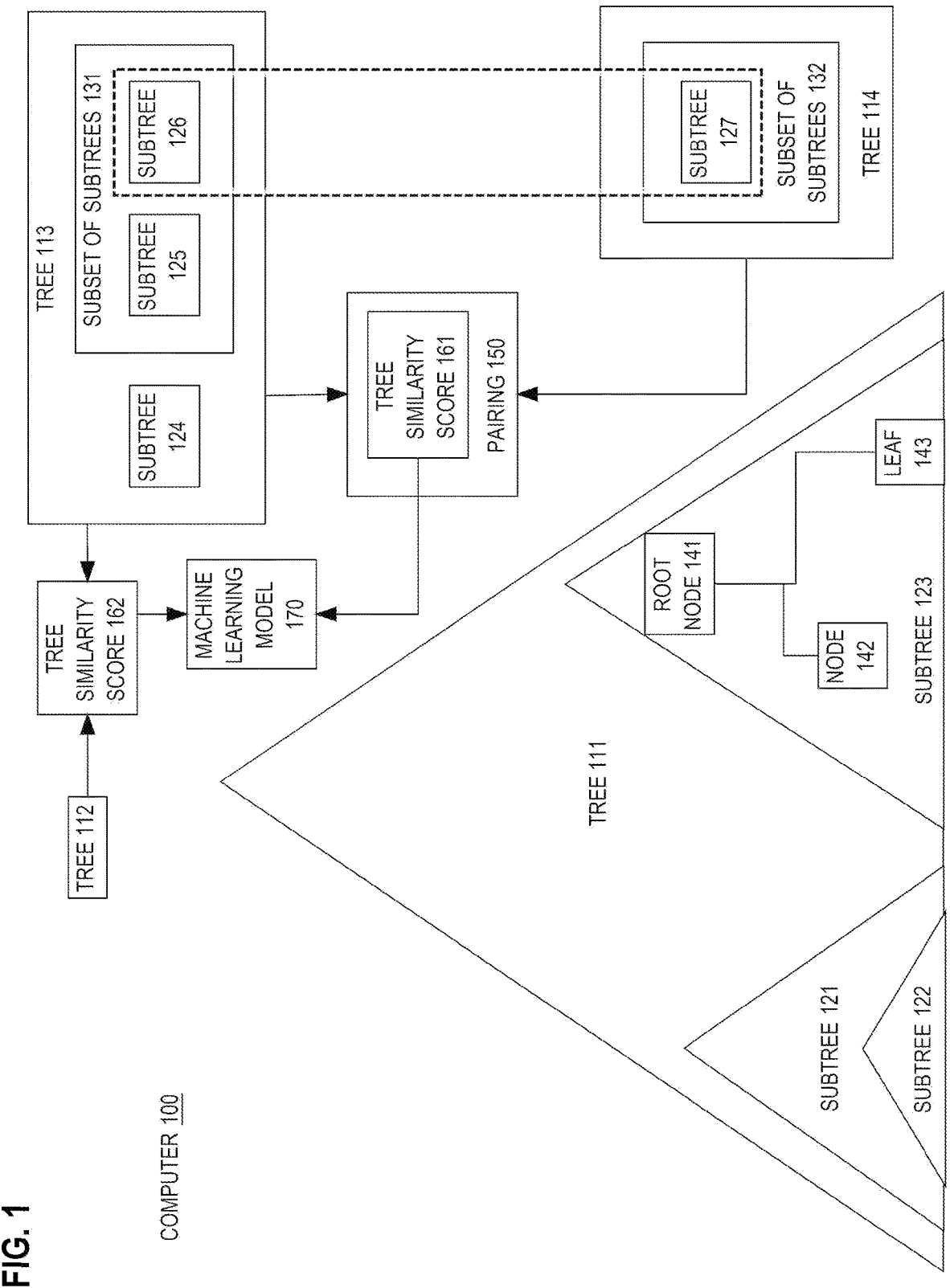
FIG. 1 is a block diagram that depicts an example computer that accelerates comparison of trees such as for further analysis by a machine learning (ML) model such as for anomaly detection.

In the following description, for the purposes of explanation, numerous specific details are set forth in order to provide a thorough understanding of the present invention. It will be apparent, however, that the present invention may be practiced without these specific details.

In other instances, well-known structures and devices are shown in block diagram form in order to avoid unnecessarily obscuring the present invention.

General Overview

Approaches herein relate to machine learning (ML) for detection of anomalous logic syntax. When populating a feature vector for inferencing by an ML model, herein are acceleration techniques for measured comparison of parse trees such as for one or a few suspect database queries and many normal database queries. In an embodiment, similarity of two trees is measured by a tree kernel that operates on an implicit feature space. Instead of extracting explicit features, pairwise similarities of two or more trees are computed to represent the data in the feature space. For a set of T abstract syntax trees (ASTs), a similarity matrix of the size T×T represents the implicit feature space of the T trees. Herein, AST and parse tree may be synonymous. Unlike as in explicit feature extraction strategies, the feature space has a fixed size T that is independent of the tree content. Whereas for an AST, the number of explicit features depends on the size of the grammar and the amount of literals in the source logic or statement.

In an embodiment, a tree similarity score such as a convolution tree kernel improves the performance of a structured query language (SQL) anomaly detection system. The tree kernel is applied to a pairing of two parse trees of SQL queries. The kernel provides a weighted and selective count of common subtrees of the two parse trees. This approach outperforms other feature extraction approaches and database anomaly detection strategies. However, the polynomial complexity with respect to the number of nodes in a tree due to the recursive structure of a parse tree is a performance bottleneck. Computing all pairwise counts of common subtrees of large trees and/or a large set of trees can be very computationally expensive.

Tree kernels may use the pairwise tree-comparison to create a feature space. For very large workloads, a pairwise comparison may be infeasible. Techniques herein improve a tree convolution algorithm by not counting common subtrees starting from a pair of respective parent nodes having an amount of immediate child nodes that do not exceed a threshold. This strategy significantly accelerates the computation of the pairwise similarities of trees. For example, if the threshold is one, starting the counting of common subtrees from a single child node does not occur. For example, single child nodes may have less contextual value than nodes with more children. Benchmarking this strategy for SQL may include a tenfold computation speedup over other tree kernel approaches without degrading anomaly detection scores. Because techniques herein are sensitive to tree leaves, terminal symbols, and literals as explained later herein, tree summarization herein may be based on more content of a tree than other approaches such as approaches that extract tree paths and ignore tree leaves. Thus, techniques herein may provide increased ML model accuracy.

With a practical parse tree, many paths in the tree do not have branches. These are sequences of nodes without branching. Branched nodes which have more than one child are more important as they reveal more contextual information. Optimizations herein leverage this common topology of narrow chains and reduce the number of compared node pairs. Furthermore, this skipping strategy is not equivalent to pruning some nodes in a tree. For a selected pair of nodes which satisfies the threshold condition the algorithm still processes the complete respective subtrees. In other words, alternatives that actually prune achieve less precise similarity measurements than techniques herein.

Accelerated tree kernel techniques herein do not degrade the performance of SQL anomaly detection. For example, convolution kernels herein are suitable for real time inferencing with live streaming logic statements such as when embedded in a multitenant database management system (DBMS). Various embodiments may entail ASTs, parse trees, or other tree related structures such as a document object model (DOM) for JavaScript object notation (JSON) or extensible markup language (XML). In an embodiment, the parse tree represents natural language such as English.

In an embodiment, a computer identifies subtrees in each of many trees. A respective subset of participating subtrees is selected in each tree. A respective root node of each participating subtree should directly have a child node that is a leaf and/or should have a degree that exceeds a branching threshold such as one. For each pairing of a respective first tree with a respective second tree, based on a count of subtree matches between the participating subset of subtrees in the first tree and the participating subset of subtrees in the second tree, a respective tree similarity score is calculated. An ML model inferences based on the tree similarity scores of the many trees.

In an embodiment, each tree similarity score is calculated by a convolution kernel. In an embodiment, a similarity matrix contains the many tree similarity scores. In an embodiment, an ML model accepts a feature vector that contains the similarity matrix and/or the many tree similarity scores.

1.0 Example Computer

FIG. 1 is a block diagram that depicts an example computer 100, in an embodiment. Computer 100 accelerates comparison of trees 111-114 such as for further analysis by machine learning (ML) model 170 such as for anomaly detection. Computer 100 may be one or more of a rack server such as a blade, a personal computer, a mainframe, a virtual computer, or other computing device.

Trees 111-114 are hierarchical data structures. In an embodiment, structured contents such as text are represented by trees 111-114 that may be parse trees or abstract syntax trees (ASTs). In an embodiment, each of trees 111-114 represents a respective logic statement such as a database query such as structured query language (SQL) or a statement in a programing language such as a code source language such as a scripting language. In an embodiment, each of trees 111-114 represents a logic script or a compilation unit of a general-purpose programing language. In an embodiment, each of trees 111-114 instead represents a hierarchical document such as a document object model (DOM) for extensible markup language (XML) or JavaScript object notation (JSON).

Tree similarity is numerically measured by counting matching subtrees when comparing trees in a pairing of two trees. For example, pairing 150 associates two trees 113-114. Tree similarity score 161 is the numerically measured similarity of the two trees of pairing 150. Tree similarity score 162 is a numerically measured similarity of two trees 112-113 of a different pairing. Tree similarity measurement and counting matching subtrees are discussed later herein.

Each of trees 111-114 consists of hierarchically connected nodes such as nodes 141-143 in tree 111. Tree nodes may be hierarchically grouped into subtrees in a same tree. For example, tree 111 contains subtrees 121-123, and subtree 123 contains nodes 141-143. Tree nodes are discussed later herein.

Trees 111-114 may be parse trees that conform to a same formal grammar such as a context free grammar (CFG). A technical problem with comparing two CFG parse trees is that the two trees may have substantially overlapping (i.e. similar) content that is differently located within both trees such that a linear enumeration of each tree's nodes, such as a preorder traversal, cannot be directly matched. For example if a small tree is a copy of a subtree of a big tree, then the small tree and the big tree have substantial similarity that may be computationally expensive to find because the big tree should be linearly scanned to find the location of the subtree, and then the subtree should be compared to the little tree. That computational expense of finding similarity is increased when two unrelated big trees are compared to find a common subtree.

However, each of both trees may contain many subtrees for comparing in a pairwise way. For example, the dashed box depicts comparison of subtrees 126-127 in respective trees 113-114. The following enumerated complications may increase the computational expense of comparing trees by comparing their subtrees.

Subtree comparison should be independent of subtree location within a tree.

Nested subtrees such as 121-122 may share some nodes such that a same node may increase the node count of many nested subtrees.

A parse tree that conforms to a formal grammar may have many redundant intermediate nodes. For example, a parse tree may be much taller than a binary tree with a same amount of leaves. See FIG. 2.

The combinatorics of pairwise comparison of subtrees is factorial, which cannot be done in polynomial time.

Numerically measuring similarity of subtrees should be sensitive to partial or fuzzy matches that may not be as straightforward as exact matches.

For those reasons, measuring tree similarity score 161 may be computationally expensive and may not scale well according to the node counts of trees 113-114. Thus, optimizations and heuristics may be essential for feasibility of tree similarity measurement. As discussed later herein for FIG. 3, tree comparison is accelerated by ignoring redundant subtrees and noisy nodes. Mathematics of tree similarity measurement are presented later herein.

As explained later herein, ignoring redundant subtrees entails excluding many subtrees from a subset of subtrees that participate in pairwise comparison when a tree is compared. That decreases how many subtrees need comparing when measuring tree similarity, which provides acceleration. For example when comparing tree 113, subtree 124 is excluded from subset of subtrees 131 that participates in pairwise comparison. Likewise, tree 114 has subset of subtrees 132. Exclusion and inclusion of subtrees from a subset of subtrees that participate in pairwise comparison is discussed later herein.

2.0 Example Parse Tree

Figure 2:
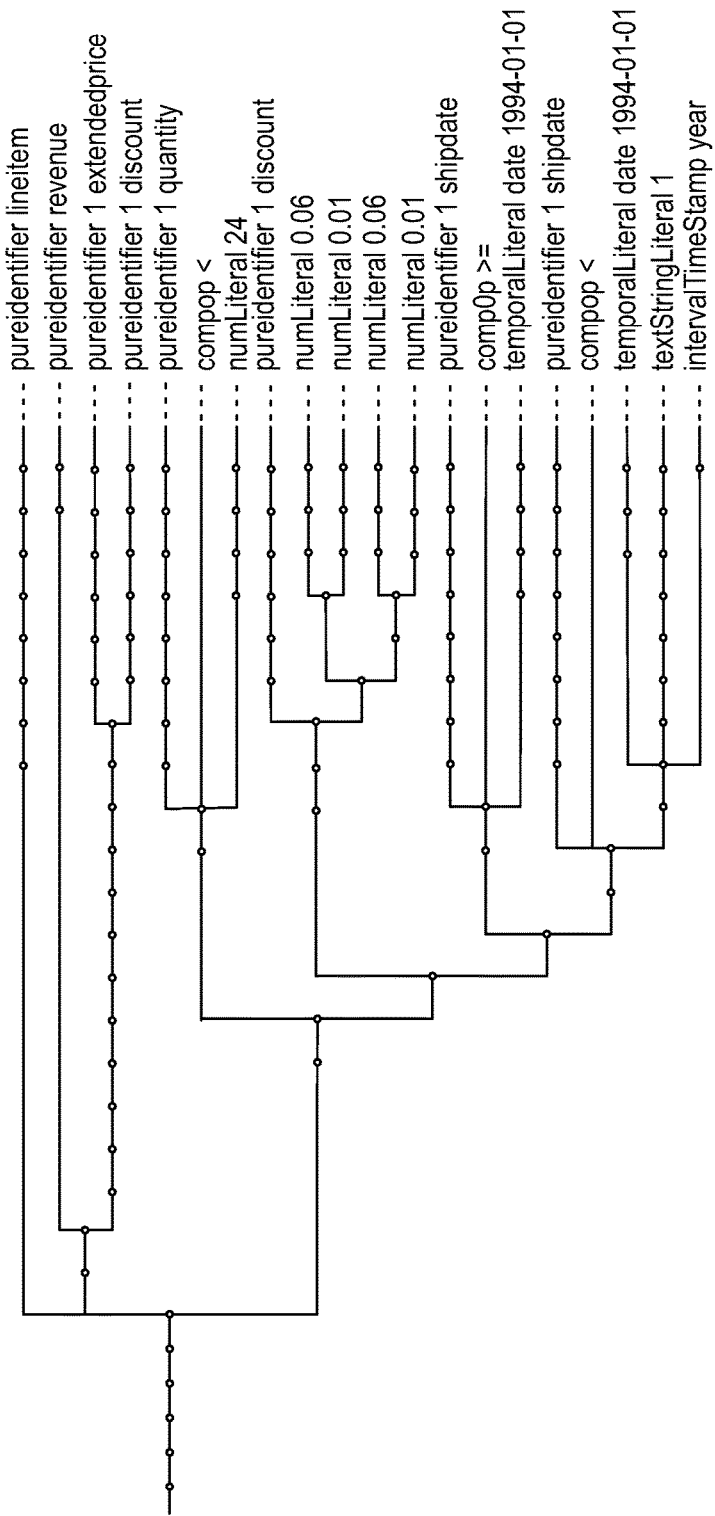
FIG. 2 is a block diagram that depicts an example parse tree that may represent a structured query language (SQL) statement such as a database query.

FIG. 2 is a block diagram that depicts an example parse tree 200, in an embodiment. Parse tree 200 may be an implementation of any of trees 111-114 of FIG. 1. In an embodiment, parse tree 200 represents a SQL statement such as a database query. Techniques for generating and analyzing parse tree 200 or an abstract syntax tree that conforms to a context free grammar are presented in related non-patent literature "Semantics of context-free languages" by Donald Knuth in *Mathematical systems theory* 2, no. 2 (1968): 127-145, which is incorporated herein by reference in its entirety.

As explained earlier herein, parse tree 200 may conform to a formal grammar that may have many redundant intermediate nodes. For example, a parse tree may be much taller than a binary tree (not shown) with a same amount of leaves. Leaf nodes are text labels shown on the right side. Leaf nodes are also known as terminal nodes. In an embodiment, a leaf node represents a token or symbol, which is an indivisible text substring extracted from larger text such as a string, logic statement, or document.

Intermediate nodes are shown as dots on horizontal lines. Horizontal lines show direct connection of a parent node and a child node. Vertical lines show branching. Branching occurs when a parent node directly has multiple child nodes.

If a vertical line does not pass through a parent node, then the parent node has no branching, which means that the parent node directly has only one child node, although that child node may directly or indirectly have other child node(s). Degree or branching factor of a parent node is a count of direct child nodes. A parent node without branching has a degree of one, which means that the parent node directly has only one child node.

Trees, subtrees, and tree nodes are data structures stored in memory. A parent node may be connected to a child node by a referential link, such as a memory address pointer or array index, that may be stored in the parent node and/or child node and refers to the other node. Tree traversal may entail dereferencing such links between nodes. Tree traversal may occur in an enumeration ordering such as preorder, in order, or post order visitation of a parent node and child nodes. Regardless of ordering, tree traversal may be based on recursion, iteration, and/or queueing. In an embodiment, detecting the degree of a parent node entails counting links that connect the parent node to direct child nodes.

Tree nodes need not be contiguously stored in memory. Tree nodes may be dynamically allocated in memory. Subtrees are composable. For example, adding a subtree to a tree may entail linking the root node of the subtree, as a child node, to a parent node already in the tree. A tree node may contain or otherwise be associated with data fields that, by inspection, may facilitate comparison of tree nodes or subtrees such as discussed later herein.

The root of parse tree 200 is shown on the left side. Parse tree 200 is shown sideways, and the horizontal line that passes through the tree root is not the top horizontal line. The top horizontal line has no branching. That is, each of the many parent nodes shown as dots on the top horizontal line directly have only one respective child node.

Parent nodes (i.e. dots) on a same horizontal line are root nodes of respective nested subtrees. The top horizontal line has eight dots, which means eight parent nodes, but only one leaf. Thus, eight nested subtrees provide structure for only one same leaf node, which is substantial redundancy that may not be meaningful when comparing trees.

Herein, redundant nested subtrees should not be treated as separate subtrees for tree similarity measurement. For a same horizontal line without branches, which is when nested parent nodes all have a same degree of one, only one of the parent nodes shall participate as a separate subtree for tree similarity measurement. That is, multiple nested subtrees with a same degree of one contribute only one separate subtree for pairwise comparison of subtrees of two trees, which greatly reduces the combinatorics of pairwise comparison of subtrees.

Of the multiple nested subtrees having the same degree of one, the smallest nested subtree is the one whose root/parent node is directly connected to the leaf node. That subtree root node is known as a preterminal node because a leaf may be known as a terminal node. Except as explained later herein for comparison of participating subtrees by recursion, of the multiple nested subtrees having the same degree of one, only the nested subtree whose root node is the preterminal node participates as a separate subtree for pairwise comparison of subtrees.

For example with tree 113 in FIG. 1: a) subtrees 124-125 may have a same degree of one, b) subtree 125 may be nested within subtree 124, and c) the root node of subtree 125 may be a preterminal node. Thus when tree 113 is compared, subset of subtrees 131 that participate in pairwise comparison includes subtree 125 but not subtree 124 except during recursive comparison.

Thus, acceleration occurs in three ways: a) most subtrees do not participate as separate subtrees for pairwise comparisons, and b) the few participating subtrees are usually the smallest. In that way, what was originally a non-polynomial problem may be effectively reduced to a scale that actually or nearly is polynomial, which is substantial acceleration. For example, even though parse tree 200 has more nodes and is taller than a binary tree (not shown) with a same amount of leaves, parse tree 200 may be faster to compare than a binary tree. Counterintuitively, larger parse tree 200 compares faster than the smaller binary tree.

3.0 Tree Similarity Measurement Process

Figure 3:
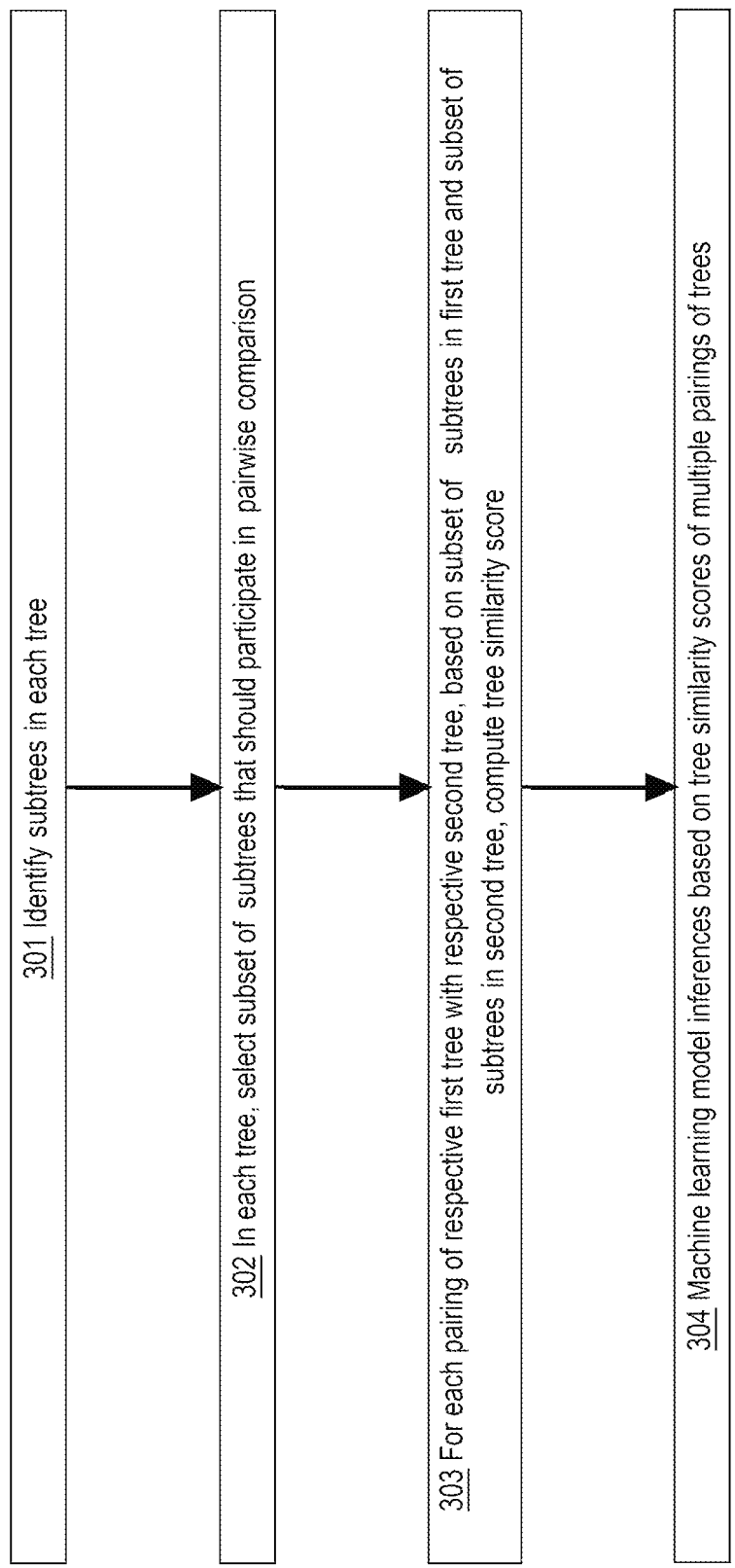
FIG. 3 is a flow diagram that depicts an example computer process that accelerates comparison of trees such as for further analysis by an ML model such as for anomaly detection.

FIG. 3 is a flow diagram that depicts an example process that computer 100 performs to accelerate comparison of trees 111-114 such as for further analysis by machine learning (ML) model 170 such as for anomaly detection. FIG. 3 is discussed with reference to FIG. 1.

Step 301 identifies subtrees in each tree 111-114. For example, tree 113 contains subtrees 124-126. Each subtree has a root node. For example, root node 141 is the root of subtree 123. A node can be the root of at most one subtree, even though that same node may occur in many nested subtrees.

A leaf node cannot be a root of a subtree, even though every subtree contains at least one leaf. Thus, a leaf node cannot be a subtree. A root node of a subtree directly has at least one child node. Thus, every parent node is a root of a respective subtree.

In an embodiment, identifying subtrees consists of identifying all parent nodes in a tree, which is the same as identifying all non-leaf nodes in the tree. Thus, the time complexity of step 301 may be no more than the complexity of traversing the tree. In an embodiment, step 301 entails tree traversal.

In each tree, step 302 selects a respective subset of subtrees that should participate in pairwise comparison. For example for tree 113, subset of subtrees 131 includes subtrees 125-126 but not subtree 124. Criteria for inclusion in the participating subset of subtrees may entail applying selection criteria to each subtree, which may be the same as applying selection criteria to each parent node in a tree, which can be done during tree traversal. Thus, steps 301-302 may be combined.

Herein, a selection criterion and a selection condition are synonymous. Selection of a subtree requires satisfying at least one selection condition. A selection condition may accept a subtree whose root node is a preterminal node, which means that the subtree's root node directly has at least one child node that is a leaf. A selection condition may accept a subtree whose root node has a degree that exceeds a branching threshold. In an embodiment, the branching threshold is one.

By performance of steps 301-302, computer 100 determines which subtrees participate in pairwise comparison and which subtrees do not. For each pairing of a respective first tree with a respective second tree, based on the participating subset of subtrees in the first tree and the participating subset of subtrees in the second tree, step 303 computes a tree similarity score that indicates how similar is the first tree to the second tree.

For example, tree similarity score 162 is a measurement of how similar are trees 112-113. Mathematics and algorithms for comparing trees based on combinatorically comparing subtrees are discussed later herein. Step 303 provides computer 100 with tree similarity scores for many or all possible pairings of all trees 111-114. In an embodiment, step 303 populates a similarity matrix that contains all of the measured tree similarity scores.

In step 304, ML model 170 inferences based on tree similarity scores of multiple pairings of trees. For example, ML model 170 may be applied to an input such as a feature vector that contains multiple tree similarity scores. For example, the feature vector may contain some or all of the similarity matrix discussed above.

In an embodiment, the similarity matrix is based on many familiar trees, which are historical sample trees that respectively may or may not be suspicious or anomalous. In an embodiment, the same similarity matrix or an additional similarity matrix is based on one or a few unfamiliar or suspect trees that deserve scrutiny such as for security reasons. The feature vector may contain content of such one or two matrices. Thus in step 304, ML model 170 may detect whether or not the one or few unfamiliar trees actually are anomalous or suspicious. For example, ML model 170 may infer an anomaly score for the feature vector, which is classified as anomalous if the anomaly score exceeds an anomaly threshold.

For example, a SQL injection attack entails inserting an expression into a query such as by string concatenation. The expression effectively provides an additional subtree that, effectively by expansion, alters the parse tree of the query. Inserting the unfamiliar subtree should decrease the tree similarity score of any comparison of the suspect parse tree against any familiar tree.

Thus, the unfamiliar subtree should have various impacts to tree similarity scores of comparing the suspect parse tree to various familiar trees, which ML model 170 may be trained to analyze and quantify (i.e. score) how anomalous are those various impacts. In that way, ML model 170 may detect a SQL injection attack or other kind of abnormal query or SQL statement, whether malicious or merely malfunctioning.

4.0 Similarity Based on Grammar

Figure 4:
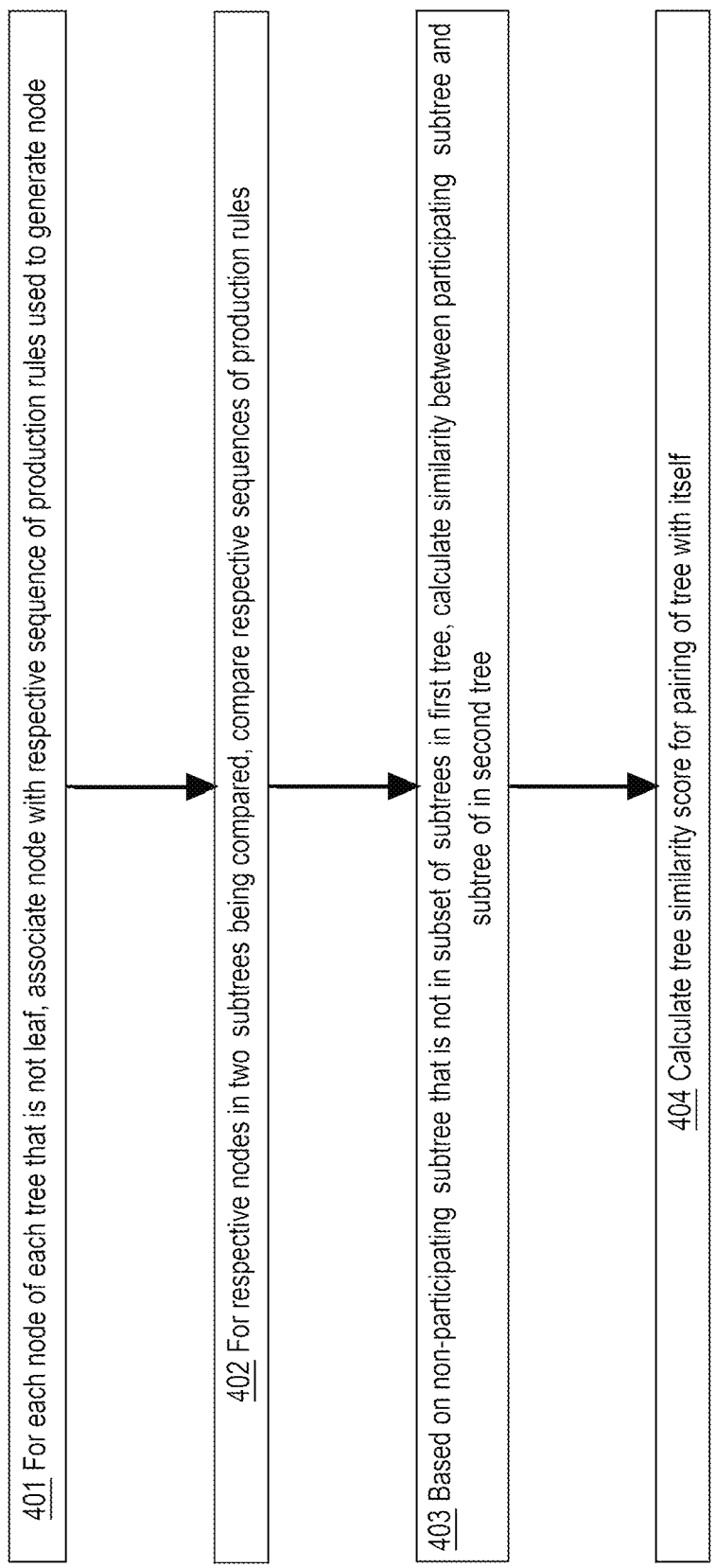
FIG. 4 is a flow diagram that depicts an example computer process that compares parse trees that were generated by applying production rules of a formal grammar during parsing of source logic.

FIG. 4 is a flow diagram that depicts an example process that a computer, such as an implementation of computer 100, performs to compare parse trees that were generated by applying production rules of a formal grammar during parsing of source logic.

A formal grammar consists of production rules that are patterns that match sequences of symbols while generating a parse tree from source logic. A symbol may be a terminal such as a source literal, or a non-terminal. A leaf node is generated for each terminal symbol.

A parent node is generated for each nonterminal symbol. Nonterminals are synthetic because they do not actually occur in the source logic but instead represent production rules that have already been applied to the source logic. A production rule defines a nonterminal symbol as a sequence of other symbols to be matched.

A production is generated when a production rule matches a sequence of symbols. A production includes the nonterminal symbol of the production rule and the matched sequence of symbols. Each parent node contains or is associated with the production caused by a production rule that matched a portion of the source logic.

Assuming that the root of a tree is at the top, the higher in the tree is a node, the longer is the node's production because the node's production contains the sequence of symbols matched in all of the subtree with that node as the root of the subtree. Two parent nodes match if their productions match. Two subtrees match if the productions of their root nodes match.

A production rule may represent the nonterminal symbol that the production rule defines. Thus, a production or a sequence of nonterminal symbols may be a sequence of production rules. Thus, each parent node and each subtree may have a sequence of production rules. That is, two parent nodes match or two subtrees match when their sequences of production rules match. Techniques using productions, production rules, and terminal and nonterminal symbols for generating tree nodes of a parse tree or an abstract syntax tree that conforms to a context free grammar are presented in related non-patent literature "Semantics of context-free languages".

For each node of each tree that is not a leaf, step 401 associates the node with a respective sequence of production rules that were used to generate the node. Here, production rules used to generate the node means production rules used to generate a subtree that has that node as the root node of the subtree. In other words, those production rules were also used to generate direct and indirect child nodes of that node.

For respective nodes in two subtrees being compared from two respective trees, step 402 compares respective sequences of production rules of both nodes. For example as explained later herein, when counting subtrees that match between the two trees, the count should not increase if both nodes have different respective sequences of production rules.

Furthermore, directly or indirectly nested within both nodes of step 402 may be other respective nodes whose respective sequences of production rules match. Thus, matching respective direct or indirect child nodes may increase a match count even when respective root nodes of enclosing subtrees are dissimilar.

For example, even though some subtrees are excluded from a tree's subset of subtrees that participate in matching as explained earlier herein, such excluded or non-participating subtrees may nonetheless increase a similarity score for pairwise comparison of two respective participating/enclosing subtrees, regardless of whether or not the respective participating subtrees have similar respective sequences of production rules. In that way, based on a non-participating subtree that is not in the subset of participating subtrees in a first tree, step 403 calculates an increase to a similarity between respective participating subtrees in two trees being compared.

In an embodiment, a similarity score for a pairing of two trees is known as a tree kernel, which is a number. As described above, similarity scoring may be based on more or less exhaustive comparing of nodes in participating subtrees, which may be a recursive activity based on recursive traversal of a subtree. A tree kernel calculated by recursive examination of nodes of participating subtrees is known as a convolution kernel.

In an embodiment mathematics, including novel improvement, for calculating a convolution kernel are based on the following summation formula.

$$\Sigma_{n1 \in N(\tau1), n2 \in N(\tau2)} \Delta(n1, n2)$$

The following are terms in the above summation formula.
τ1 and τ2 are two trees in a pairing for comparison for similarity measurement
$N(\tau)$ are all nodes in a tree that are not leaves and have a degree above a threshold
$\Delta(n1, n2)$ is a pairwise comparison of two respective nodes for similarity measurement as discussed below As discussed earlier herein, only subtrees having a respective root node with a degree that exceeds a threshold are included in the subset of participating subtrees. Thus, a novel and accelerating improvement is that $N(\tau)$ includes only: a) nodes having a sufficient degree, and b) preterminal nodes regardless of degree.

In an embodiment mathematics, including novel improvement, for calculating a pairwise comparison of two nodes 1 are based on the following piecewise definition.

$$\Delta(n1, n2) = \begin{cases} 0 & \text{if respective direct children do not match} \\ \lambda & \text{if } n1 \text{ and } n2 \text{ are preterminal nodes} \\ & \text{that have matching leaf childs} \\ \Delta*(n1, n2) & \text{otherwise} \end{cases}$$

The following are terms in the above piecewise definition.
λ is a positive constant that is less than one in most embodiments
$\Delta*(n1, n2)$ is a pairwise comparison of respective child nodes for similarity measurement as follows The pairwise comparison $\Delta*(n1, n2)$ is a multiplicative product of similarity scores of comparisons of respective direct child nodes of two parent nodes. In an embodiment, mathematics for calculating a pairwise comparison of children of two nodes as a scalar number are based on the following multiplication formula.

$$\Delta*(n1, n2) = \lambda \prod_{k=1}^{|children(n1)|} [1 + \Delta(child_k(n1), child_k(n2))]$$

The following are terms in the above multiplication formula.
|children(n)| is a count of direct children of a node
$child_k(n)$ is the k-th direct child node of a parent
[ ] encloses a single number that is a similarity score of a pairwise comparison of two respective children
λ is a weight that is the same constant as in the above piecewise definition.

In an embodiment, the product operator in the above multiplication formula is an inner product of multiple one-dimensional vectors. In any case, the result of the above multiplication formula is scalar that is a number.

As discussed earlier herein, tree similarity scores for many or all possible pairings of many trees may be calculated and used together such as in a similarity matrix and/or a feature vector. In an embodiment, all possible pairings of many trees includes pairing a tree with itself. That is, measuring self-similarity of a tree as a convolution kernel is neither arithmetically trivial nor operationally useless. Step 404 calculates a tree similarity score for a pairing of a tree with itself.

5.0 Example Architecture

Figure 5:
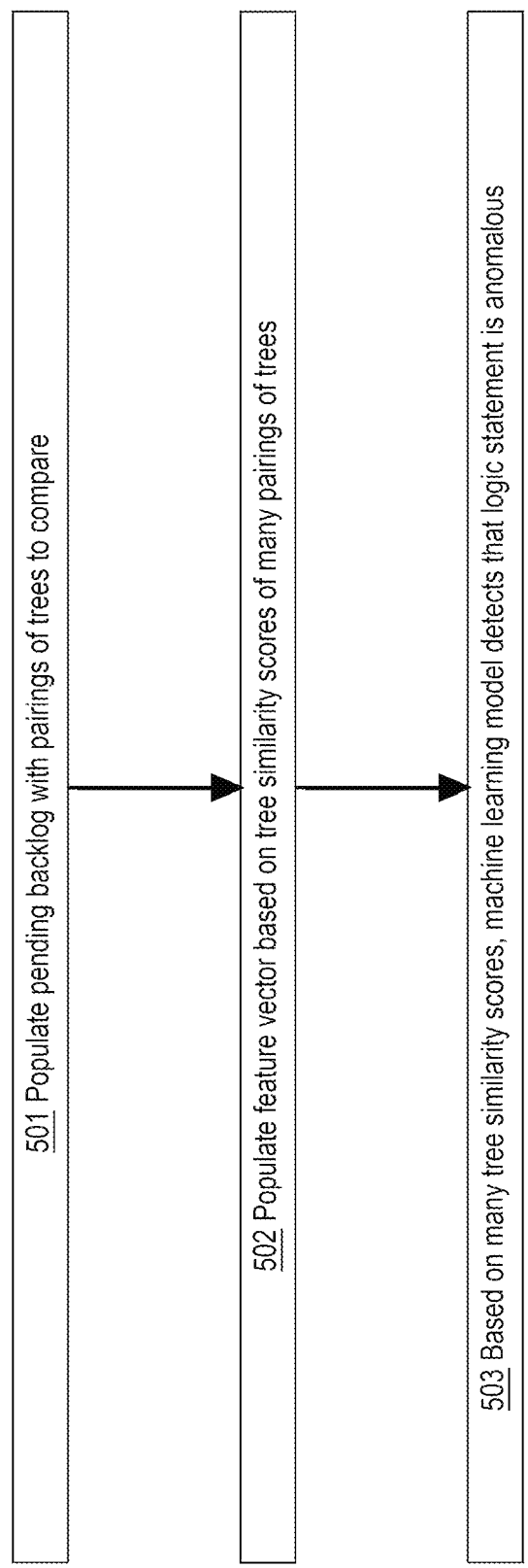
FIG. 5 is a flow diagram that depicts an example computer process that accelerates an ML model detecting that a logic statement is anomalous.

FIG. 5 is a flow diagram that depicts an example process that a computer, such as an implementation of computer 100, performs to accelerate an ML model detecting that a logic statement is anomalous.

As explained earlier herein, measuring similarity of a pairing of two trees is expensive due to: a) non-polynomial combinatorics of pairings of respective subtrees, and b) convolution kernel calculation based on recursion and non-trivial mathematics. Task parallelism by distributed computers and or multiple processing cores may accelerate construction of a similarity matrix as follows.

Step 501 populates a pending backlog with pairings of trees or subtrees to compare. For example, comparing a suspect tree to fifty known trees entails at least fifty pairings of two trees. Each distinct pairing of two trees may be appended onto a backlog queue, and multiple computers or processors or cores may race to repeatedly dequeue a next pairing from the backlog and measure the tree similarity of the pairing. In an embodiment, the shared queue needs synchronization, but the similarity measurement tasks do not need synchronization. In an embodiment, the queue is a priority queue that is sorted so that pairings of large trees are dequeued before pairings of small trees, which minimizes total latency.

Step 502 populates a feature vector based on tree similarity scores of many pairings of trees as discussed earlier herein. For example, the feature vector may contain a similarity matrix that is based on pairings of each of one or a few suspect trees to each of many known trees. Convolution kernels between two known trees may be calculated in advance such as offline. Convolution kernels between two suspect trees or between a suspect tree and a known tree cannot be calculated until runtime when the suspect tree(s) are received such as a parse tree of a suspect SQL query.

Based on many tree similarity scores, an already-trained ML model detects that a logic statement is anomalous in step 503. For example, the ML model may inference based on a feature vector that includes a similarity matrix that contains calculated convolution kernels of many pairings of trees. Depending on the embodiment, the logic statement may be a SQL query or a statement of a scripting language or a general-purpose programing language. Depending on the embodiment, anomaly detection may cause one or more of various reactions such as logging the statement as suspicious or abnormal, rejecting the statement instead of executing it, raising an alert, or diverting the statement for more intensive manual or automatic inspection.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

6.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces.

A tablespace is a set of one or more files that are used to store the data for various types of database objects, such as a table. If data for a database object is stored in a tablespace, a database dictionary maps a database object to one or more tablespaces that hold the data for the database object. A database dictionary is referred to by a DBMS to determine how to execute database commands submitted to a DBMS. Database commands can access the database objects that are defined by the database dictionary.

6.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
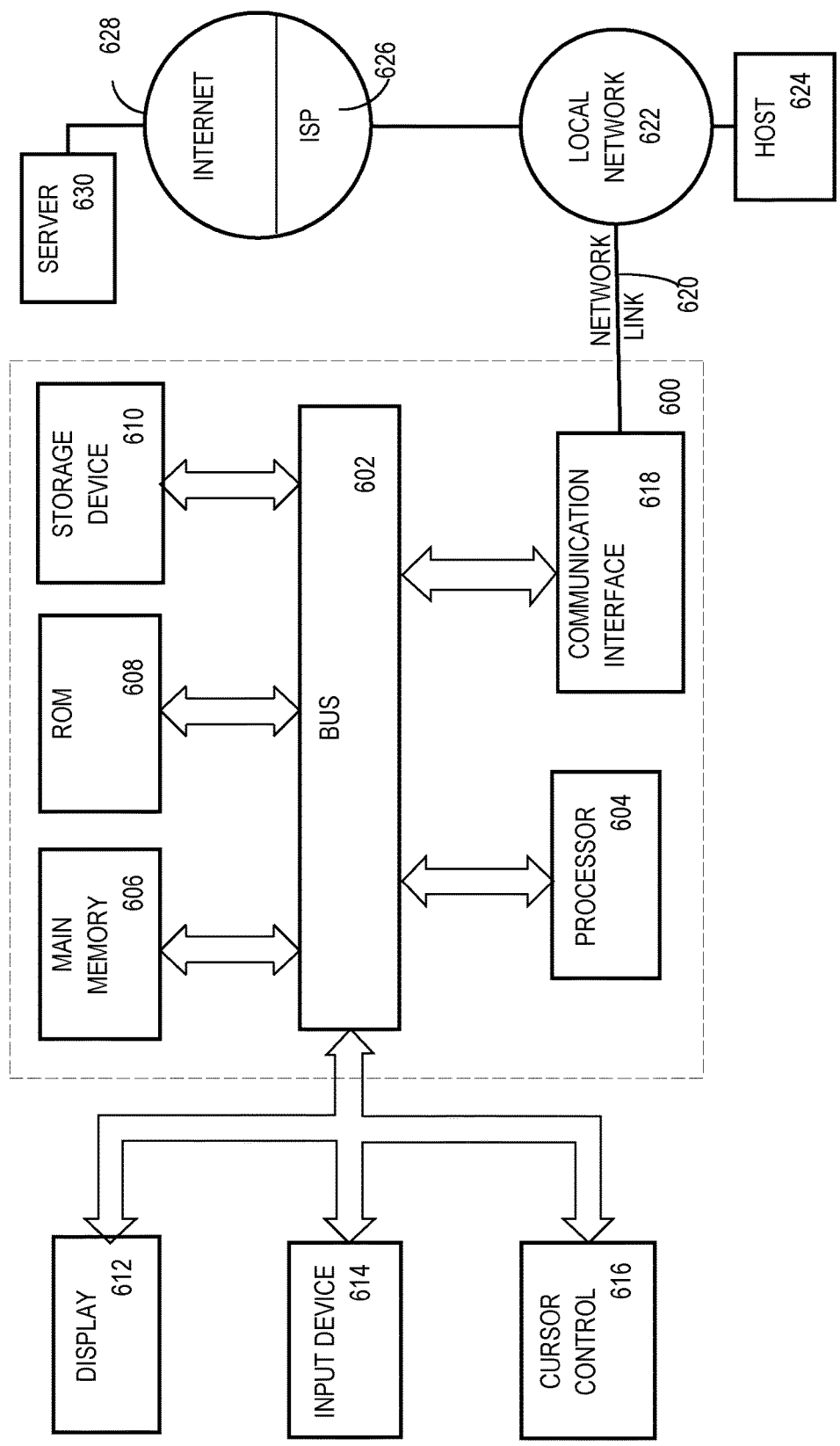
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
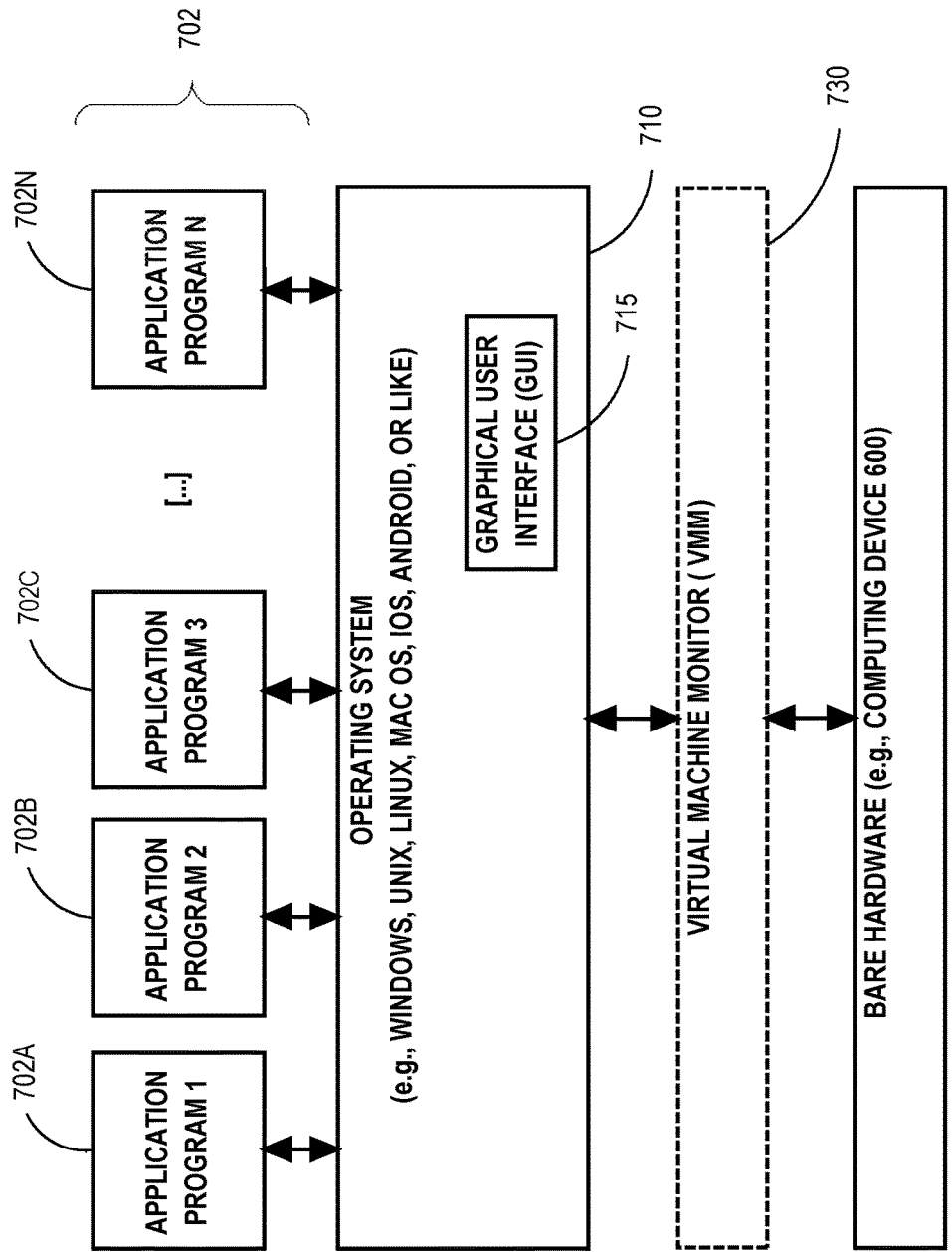
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27;2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the dataset, such as with feature bootstrap aggregating (bagging). Therefore, the decision trees gain accuracy as the decision trees grow without being forced to over fit training data as would happen if the decision trees were forced to learn all feature dimensions of the dataset. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
identifying a respective plurality of subtrees in each tree of a plurality of trees;
selecting a respective subset of subtrees of the plurality of subtrees in each tree of the plurality of trees, wherein a respective root node of each subtree of the subset of subtrees satisfies at least one condition selected from the group consisting of:
a child node of said root node of said subtree is a leaf, and
a degree of said root node of said subtree exceeds a branching threshold;
for each pairing of a respective first tree of the plurality of trees with a respective second tree of the plurality of trees, based on a count of subtree matches between said subset of subtrees in the first tree and said subset of subtrees in the second tree, computing a respective tree similarity score, of a plurality of tree similarity scores;
inferencing, by a machine learning model, based on the plurality of tree similarity scores.

2. The method of claim 1 wherein said degree of said root node of each subtree of the subset of subtrees exceeds said branching threshold comprises said degree of said root node of a subtree of a parse tree of one selected from the group consisting of a database statement, a document object model (DOM), a logic statement, a logic script, and a compilation unit of a general-purpose programing language exceeds said branching threshold.

3. The method of claim 2 wherein said degree of said root node of said subtree of said parse tree of said database statement exceeds said branching threshold comprises said degree of said root node of said subtree of said parse tree of a structured query language (SQL) statement exceeds said branching threshold.

4. The method of claim 1 wherein said degree of said root node of each subtree of the subset of subtrees exceeds said branching threshold comprises said degree of said root node of said subtree exceeds one.

5. The method of claim 1 wherein said computing said tree similarity score for said pairing of said first tree with said second tree comprises computing said tree similarity score for said pairing of said first tree with said first tree.

6. The method of claim 1 further comprising populating a feature vector based on the plurality of tree similarity scores.

7. The method of claim 1 further comprising populating a pending backlog with a plurality of pairings that contains said each pairing of said respective first tree of the plurality of trees with said respective second tree of the plurality of trees.

8. The method of claim 1 wherein:
said subset of subtrees of said plurality of subtrees in said first tree contains a participating subtree that contains a non-participating subtree that is not in said subset of subtrees of said plurality of subtrees in said first tree;

said computing said tree similarity score for said pairing of said first tree with said second tree comprises calculating, based on said non-participating subtree that is not in said subset of subtrees of said plurality of subtrees in said first tree, a similarity between said participating subtree and a subtree of said plurality of subtrees in said second tree.

9. The method of claim 1 wherein:

the method further comprises for each particular node of each tree of the plurality of trees that is not a leaf, associating the particular node with a respective sequence of production rules of a grammar that were used to generate the particular node;

said computing said tree similarity score for said pairing of said first tree with said second tree comprises comparing said sequence of production rules of a node of a subtree of said plurality of subtrees in said first tree to said sequence of production rules of a node of a subtree of said plurality of subtrees in said second tree.

10. The method of claim 1 wherein said inferencing by said machine learning model comprises detecting, based on the plurality of tree similarity scores, that a logic statement is anomalous.

11. One or more non-transitory computer-readable media storing instructions that, when executed by one or more processors, cause:

identifying a respective plurality of subtrees in each tree of a plurality of trees;

selecting a respective subset of subtrees of the plurality of subtrees in each tree of the plurality of trees, wherein a respective root node of each subtree of the subset of subtrees satisfies at least one condition selected from the group consisting of:

a child node of said root node of said subtree is a leaf, and a degree of said root node of said subtree exceeds a branching threshold;

for each pairing of a respective first tree of the plurality of trees with a respective second tree of the plurality of trees, based on a count of subtree matches between said subset of subtrees in the first tree and said subset of subtrees in the second tree, computing a respective tree similarity score, of a plurality of tree similarity scores;

inferencing, by a machine learning model, based on the plurality of tree similarity scores.

12. The one or more non-transitory computer-readable media of claim 11 wherein said degree of said root node of each subtree of the subset of subtrees exceeds said branching threshold comprises said degree of said root node of a subtree of a parse tree of one selected from the group consisting of a database statement, a document object model (DOM), a logic statement, a logic script, and a compilation unit of a general-purpose programing language exceeds said branching threshold.

13. The one or more non-transitory computer-readable media of claim 12 wherein said degree of said root node of said subtree of said parse tree of said database statement exceeds said branching threshold comprises said degree of said root node of said subtree of said parse tree of a structured query language (SQL) statement exceeds said branching threshold.

14. The one or more non-transitory computer-readable media of claim 11 wherein said degree of said root node of each subtree of the subset of subtrees exceeds said branching threshold comprises said degree of said root node of said subtree exceeds one.

15. The one or more non-transitory computer-readable media of claim 11 wherein said computing said tree similarity score for said pairing of said first tree with said second tree comprises computing said tree similarity score for said pairing of said first tree with said first tree.

16. The one or more non-transitory computer-readable media of claim 11 wherein the instructions further cause populating a feature vector based on the plurality of tree similarity scores.

17. The one or more non-transitory computer-readable media of claim 11 wherein the instructions further cause populating a pending backlog with a plurality of pairings that contains said each pairing of said respective first tree of the plurality of trees with said respective second tree of the plurality of trees.

18. The one or more non-transitory computer-readable media of claim 11 wherein:

said subset of subtrees of said plurality of subtrees in said first tree contains a participating subtree that contains a non-participating subtree that is not in said subset of subtrees of said plurality of subtrees in said first tree;

said computing said tree similarity score for said pairing of said first tree with said second tree comprises calculating, based on said non-participating subtree that is not in said subset of subtrees of said plurality of subtrees in said first tree, a similarity between said participating subtree and a subtree of said plurality of subtrees in said second tree.

19. The one or more non-transitory computer-readable media of claim 11 wherein:

the instructions further cause for each particular node of each tree of the plurality of trees that is not a leaf, associating the particular node with a respective sequence of production rules of a grammar that were used to generate the particular node;

said computing said tree similarity score for said pairing of said first tree with said second tree comprises comparing said sequence of production rules of a node of a subtree of said plurality of subtrees in said first tree to said sequence of production rules of a node of a subtree of said plurality of subtrees in said second tree.

20. The one or more non-transitory computer-readable media of claim 11 wherein said inferencing by said machine learning model comprises detecting, based on the plurality of tree similarity scores, that a logic statement is anomalous.

* * * * *

UNITED STATES PATENT AND TRADEMARK OFFICE
CERTIFICATE OF CORRECTION

PATENT NO. : 11,449,517 B2
APPLICATION NO. : 17/131299
DATED : September 20, 2022
INVENTOR(S) : Schneuwly et al.

It is certified that error appears in the above-identified patent and that said Letters Patent is hereby corrected as shown below:

On the Title Page

On page 2, Column 1, item [56] under Other Publications, Line 17, delete "fro" and insert -- for --, therefor.

On page 2, Column 1, item [56] under Other Publications, Line 21, delete "Applicationsm" and insert -- Applications --, therefor.

On page 2, Column 1, item [56] under Other Publications, Line 43, delete "Nural" and insert -- Neural --, therefor.

On page 2, Column 2, item [56] under Other Publications, Line 51, delete ""Continous" and insert -- "Continuous --, therefor.

On page 3, Column 1, item [56] under Other Publications, Line 20, delete "31 st" and insert -- 31st --, therefor.

On page 3, Column 2, item [56] under Other Publications, Line 16, delete "Sequwnrial" and insert -- Sequential --, therefor.

On page 3, Column 2, item [56] under Other Publications, Line 17, delete "Communicaitons" and insert -- Communications --, therefor.

On page 2, Column 1, item [56] under Other Publications, Line 21, delete "Applicationsm" and insert -- Applications --, therefor.

In the Specification

In Column 10, Line 40, delete "and or" and insert -- and/or --, therefor.

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,449,517 B2

In Column 20, Line 4, delete "and or" and insert -- and/or --, therefor.

In the Claims

In Column 22, Line 57, Claim 5 delete "first tree." and insert -- second tree. --, therefor.

In Column 24, Line 16, Claim 17 delete "first tree." and insert -- second tree. --, therefor.